Patented May 1, 1934

1,957,337

UNITED STATES PATENT OFFICE 1,957,337

METHOD OF BLEACHING FLOUR

Louis W. Haas, Chicago, Ill., assignor, by mesne assignments, to J. R. Short Milling Company, Chicago, Ill., a corporation of Illinois No Drawing. Application October 9, 1933, Serial No. 692,903

8 Claims. (Cl. 99—10)

The present invention relates to a method of bleaching flour.

In the specification of my application for patent, Serial No. 570,963, filed October 24, 1931, of which this application is a continuation in part, a bleaching agent for bleaching flour is described which is solely of vegetable origin. More particularly the bleaching agent is prepared from legumes, such as soy beans. Various methods of preparing this all vegetable bleaching agent are described in that specification together with various methods of utilizing it in the process of bleaching flours during bread making. Further methods are also described in the specification of pending patent applications filed jointly by myself and Ralph Bohn, Serial No. 310,963, filed October 5, 1928, and my application Serial No. 498,837, filed November 28, 1930.

It is assumed that the bleaching action is due to the bleaching agent taking up oxygen from the air and then giving it up in the dough batch, and it has been found that very thorough mixing and complete aeration are essential requirements to obtain good bleaching results. To this end high-speed dough mixing machines have been preferably used to obtain the desired bleaching results. Slower speeds require longer treatment and doughs mixed by hand or in the so-called slow-speed mixers do not improve sufficiently in colour no matter how much bleaching material is added.

The present invention has for its object to overcome the disadvantages of slow-speed mixing, and to provide a method of using the all vegetable bleaching agent with slow-speed mixers which will nevertheless produce the desired degree of bleaching. To this end, the method according to the invention consists in initially mixing the bleaching agent in a slack or soft dough in a slow-speed mixer.

According to the preferred method, the softness or slackness of the dough is obtained by withholding a substantial portion of the flour when the dough batch is first mixed. The dough is thus maintained sufficiently soft to be worked fairly easily by hand or with the slow speed operation in which the mixers operate from twenty to thirty five revolutions per minute. Under such conditions the bleaching agent has an opportunity to act, and after bleaching is effected to the extent desired, the remaining portion of flour is added in the last few minutes of mixing time and the concluding treatment made with the usual stiff dough. The amount of flour to be withheld depends on the amount of the remaining ingredients and the power and speed of the machinery, and is within the ready knowledge of the baker once he has become acquainted with the general proposition of using the method of this invention. From 5% to 10% or more of the flour may be withheld without danger of causing streaks in the crumb of the bread. The other baking ingredients, including yeast and yeast food and other materials may be used in the original batch or all or some of them may be withheld and added to the batch later along with the balance of the flour. Thus it will be understood that it is possible to omit some or all of the miscellaneous baking ingredients from the first slack batter or dough.

No peculiar problem is involved in making slack doughs. This invention consists in effecting the bleaching action with the use of slack doughs and under conditions of slow speed mixing, by hand or machinery.

In order that the invention may be more clearly understood reference will now be made to some facts which have been established in connection with this invention. The following straight dough formula may be used:

700.00 grams unbleached flour.
24.5 grams sugar.
12.25 grams salt.
15.00 grams yeast.
3.50 grams yeast food.
14.00 grams lard.
10.5 grams bleaching agent (comprising 20% soy bean flour and 80% of a carrier known under the trade name "Ceratex") and consisting of a processed corn (maize) flour.

If desired, the bleaching agent may be soaked prior to mixing for about 15 minutes in the baking solution containing sugar, salt, yeast food, and yeast.

For best results it seems desirable to have a dough of such consistency that it adheres to the walls of the mixing bowl, yet can be removed from the bowl by the mixing blade. This condition insures maximum exposure of dough to air. Experience has shown that when such material is mixed in a slow speed mixer, as for example a mixer of the Hobart type, and operated at the lowest speed for 15 minutes, widely different results are obtainable, depending on the quantity of water used. It is recommended that 2% more of water be specified than is normally needed in working dough. Less than the normal quantity of water adversely affects bleaching and even a normal quantity of water results in insufficient bleaching. Similarly, a relatively soft dough is satisfactorily bleached, while a slightly stiff dough is likely to be poorly bleached. Nevertheless, good results are obtained by using normal absorption while yet withholding a small proportion of the flour or flour and other ingredients until the last few minutes of mixing. It appears that 5% and even 10% or more flour may be withheld without serious danger of causing streaks in the crumb of bread.

It may be further noted that time for completing the bleaching operation becomes shorter according as the dough is softer. Thus 10 minutes mixing with 5% flour withheld produces a bleach superior to that obtained when the dough is mixed for the same time with 4% flour withheld. 7 minutes of mixing with 5% flour withheld produces a bleach superior to that obtained when the dough is mixed for the same time with 4% flour withheld. 7 minutes of mixing with 5% flour withheld suffices to produce satisfactory bleaching.

The subject matter hereof is predicated in part on the disclosure of my said application Serial No. 570,963, filed October 24, 1931.

I claim:

1. The method of bleaching flour which consists in incorporating an all vegetable bleaching agent of the kind mentioned into a slack dough of unbleached or insufficiently bleached flour, and subsequently mixing the dough at a slow speed.

2. The method of bleaching flour which consists in incorporating an all vegetable bleaching agent of the type mentioned in a slack dough mixture, mixing the dough in a slow speed mixer, and thereafter adding an additional amount of flour to make the dough stiffer than during the slow speed treatment.

3. The process of preparing dough which consists in mixing together in a slow speed mixer a slack dough comprising the major portion of the flour, all the water to be used, a small proportion of an all vegetable bleaching agent of the type mentioned and the other ingredients, mixing the slack dough until the desired degree of bleaching is reached and thereafter adding the remaining portion of the flour and completing the mixing.

4. A process of making bread wherein the flour employed is bleached during the preparation of the dough, comprising incorporating with the flour to be bleached and other dough ingredients a bleaching agent which is solely of vegetable origin, the presence of which during dough mixing serves to eliminate the yellowish tint of unbleached flour characteristic of the presence of carotin, making the dough comparatively slack and working it slowly, until the bleaching result is perceptibly achieved, thereafter adding an additional amount of flour until the dough is of the desired ultimate consistency, continuing the working of the dough until the added flour is thoroughly incorporated, and thereafter baking the dough.

5. A process of making bread as claimed in claim 4, which consists in determining the formula to be used, including a small quantity of an all vegetable bleaching agent, preparing an initial dough mixture comprising all the ingredients but withholding up to 10% of the flour for the loaf, working the dough mixture at a slow speed until the bleaching of the flour is substantially completed to the desired degree, thereafter adding the remaining portion of the flour, continuing the working of the dough until the added flour is thoroughly incorporated, and then baking the dough.

6. A process of preparing bread and simultaneously bleaching the color thereof, which process comprises incorporating with flour to be bleached and other dough ingredients a portion of an all-vegetable agent, the presence of which during dough mixing serves to eliminate the yellowish tint of unbleached flour characteristic of the presence of carotin, working the dough comparatively slowly until the bleaching result is perceptibly achieved, thereafter adding an additional amount of flour until the dough is stiffer than during the slow speed treatment, and continuing the working of the dough until the added flour is thoroughly incorporated, and thereafter baking the dough.

7. A process of preparing bread and simultaneously bleaching the color thereof, which process comprises incorporating with flour to be bleached and other dough ingredients a portion of an all-vegetable agent, the presence of which during dough mixing serves to eliminate the yellowish tint of unbleached flour characteristic of the presence of carotin, working the dough in a mixer having rotatable elements operating at a speed not greater than 35 R. P. M. until the bleaching result is perceptibly achieved, thereafter adding an additional amount of flour until the dough is stiffer than during the slow speed treatment, and continuing the working of the dough until the added flour is thoroughly incorporated, and thereafter baking the dough.

8. A process of preparing bread and simultaneously bleaching the color of the flour thereof, which process comprises determining the formula for the loaf desired including that portion of an all-vegetable agent, the presence of which during the dough mixing serves to eliminate the yellowish tint of unbleached flour characteristic of the presence of carotin, preparing an initial dough mix containing the major portion of the flour for the loaf but not all of it, working the dough mixture in the condition of a slack dough, continuing the working until the bleaching of the flour thereof is substantially complete to the point desired, thereafter adding the remaining portion of the flour and thereby stiffening the initial dough batch, and thereafter baking.

LOUIS W. HAAS.